March 31, 1942. D. R. MORRIS 2,278,279
WARNING SIGNAL FOR COOLING SYSTEMS OF AUTOMOBILES
Filed March 3, 1939
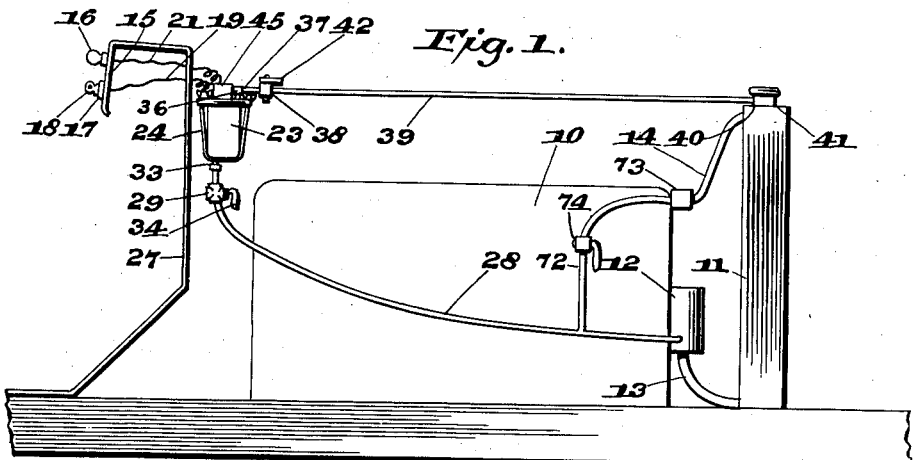
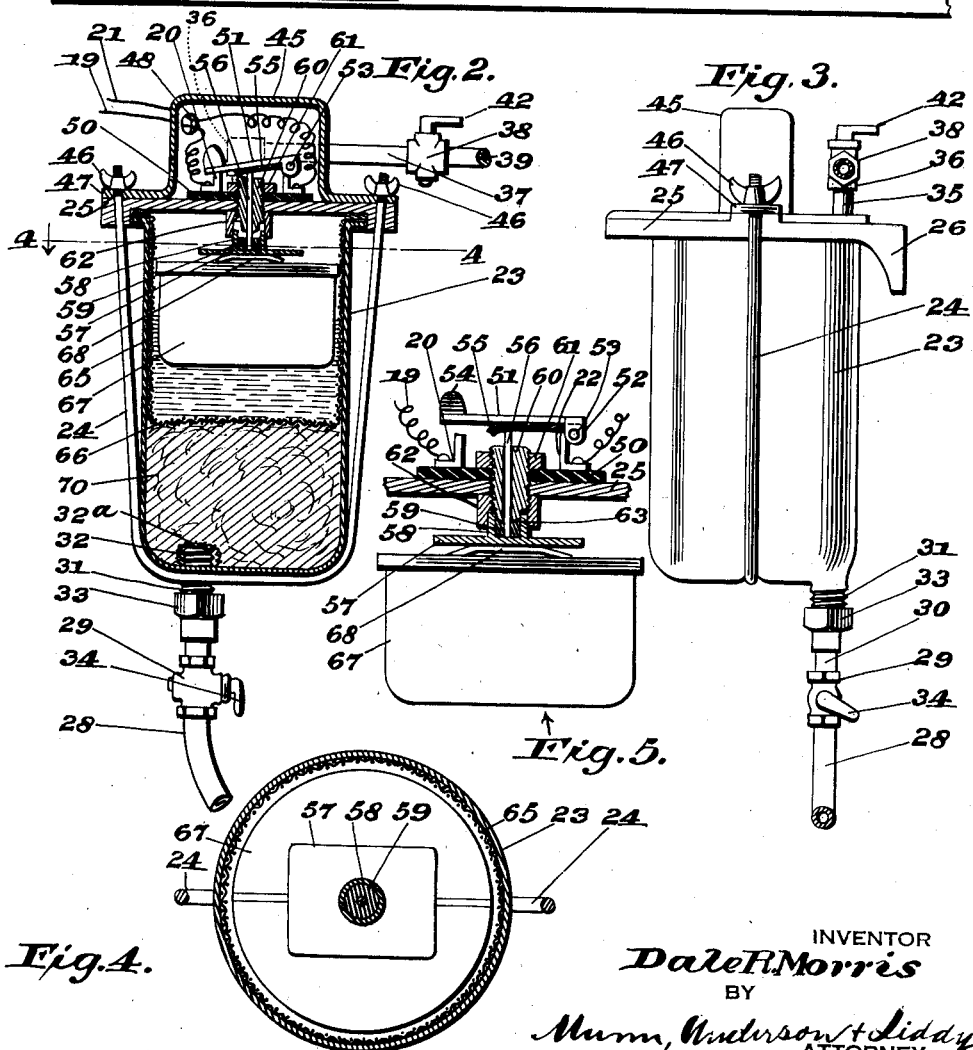
INVENTOR
Dale R Morris
BY
Munn, Anderson + Liddy
ATTORNEY Patented Mar. 31, 1942

2,278,279

UNITED STATES PATENT OFFICE 2,278,279

WARNING SIGNAL FOR COOLING SYSTEMS OF AUTOMOBILES

Dale R. Morris, Greenville, Ohio

Application March 3, 1939, Serial No. 259,682

1 Claim. (Cl. 200—84)

This invention relates to warning signals for cooling systems of motor vehicles.

An object of the invention is the provision of a device for warning the operator of a motor driven vehicle that the level of the liquid in the cooling system has fallen below a predetermined level and in which a visible or audible signal is brought into operation by the closing of a switch of an electric circuit, the switch being closed by the falling of the cooling liquid in a container which is located at a predetermined level of the liquid in the cooling system, a float being disposed within the container and having an operating rod for maintaining the switch open during normal conditions but permitting the switch to close under abnormal conditions.

Another object of the invention is the provision of a device giving a visible or audible indication to the operator of a motor vehicle that the fluid in the cooling system has dropped below a predetermined level, all of the elements for controlling the indicator being located at a predetermined level of the liquid in the cooling system so that when the liquid in the unit falls below the predetermined level a float in the unit will be lowered for releasing a switch to closing position for an electric circuit.

A further object of the invention is the provision of a device for giving visible or audible indications to the operator of a motor driven vehicle for warning the operator that the liquid in the cooling system of the motor has dropped below a predetermined level, the device being embodied in a compact unit located at a predetermined height so that when the level of the liquid in the cooling system falls below such height a signal will be set in operation, the unit including a container which is in communication with the cooling system at a point adjacent the inlet side of the water pump for supplying the liquid to the container while the outlet of the container is directed to the top of the radiator filler neck.

This invention will be best understood from a consideration of the following detailed description, in view of the accompanying drawings forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a side view in elevation of an automobile engine showing my invention applied thereto, Figure 2 is a vertical section of a unit including the important features of the invention, Figure 3 is a side view of the unit shown in Figure 2, Figure 4 is a horizontal section taken along the line 4—4 of Figure 2, and Figure 5 is an enlarged view partly in section of the operating elements of the device.

Referring more particularly to the drawing, 10 designates a motor of any well known type which may be employed in a tractor, truck, bus, passenger automobile, stationary engine, or any other type of motor which is adapted to be cooled with a liquid. The motor has the associated radiator 11, water pump 12, inlet connections 13 between the radiator and the cylinder block of the engine and an outlet connection 14 between the upper end of the cylinder block and the upper end of the radiator.

Upon the instrument panel 15 of the motor vehicle is mounted a lamp 16 or any other type of warning signal. The usual switch lock 17 operated by a key 18 is also located on the instrument panel. A wire 19 is connected between the switch 17 and a contact 20. A wire 21 is connected between a contact of the lamp 16 and a contact 22, as shown more particularly in Figs. 1, 2 and 5. When the device is used on a tractor or other type of vehicle which is not equipped with a battery, a wire 19 is attached to the magneto in such a manner that the magneto will be shorted and thus stop the motor.

A container 23, which may be formed of any suitable material, such as glass or metal, is supported by means of a U-shaped hanger 24 and a cover plate 25 which has a flange 26 adapted to be secured in any approved manner to a fixed part of the motor vehicle as will be presently explained. In the present instance the container 23 is secured to the instrument panel approximately midway between the top of the cylinder head and the top of the radiator supply. The connection of the container with some part of the motor equipment or part of the vehicle is immaterial since it will work just as well if located adjacent the radiator 11 as it does when it is connected with the dash 27. The height of the container on the other hand relative to the normal water level in the cooling system is important because a decrease in the height of the water level of the cooling system will set the apparatus in operation.

A tube 28, shown more particularly in Fig. 1, is connected to the inlet side of the pump 12 where the pressure of the fluid in the cooling system is low and may not amount to more than one pound. This tube extends to a valve casing 29 and a short tube 30 connects the valve casing with a nipple 31 which is threaded through the bottom of the container 23 and projects above the inner surface of the bottom of said container as shown at 32. Any well known form of union 33 may be employed for connecting the tube 30 with the nipple 31.

A valve is located within the casing 29 and is operated by a handle 34 for cutting off the flow of liquid to the container 23.

A tube 35 is secured to the closure 25 and this tube carries a hollow head 36 into which a pipe 37 is secured. A valve casing 38 connects the pipe 37 with a pipe 39 and the last-mentioned pipe is connected at 40 with the radiator filler neck 41 or to a high point in the radiator 11.

In the newer types of automobiles the water pumps on the inlet side are provided with a nipple for making connections with a hot water heater and where desired the tube 28 may be connected with this nipple.

A valve is located within the casing 38 and is operated by a handle 42 for cutting off the outlet pipe 39 between the container 23 and the radiator 11 when desired.

A switch box generally designated by the numeral 45 is secured to the closure 25 by means of wing nuts 46 which are threaded onto the free ends of the U-shaped hanger 24. The ends of the U-shaped hanger, as shown in Fig. 2, pass through perforations in the closure 25 and flanged ends 47 which extend from the box 45. This box is also provided with an opening 48 through which the wires 19 and 21 pass.

A plate 50 formed of insulating material is secured to the closure 25 in any approved manner and the spaced contacts 20 and 22 are secured to the said plate.

A switch arm 51 has depending ears 52 which are pivoted at 53 upon the upper end of the contact 22. The outer free end of this arm is provided with a weight 54 for maintaining the arm in its lowermost position. A strip of insulating material 55 is secured to the underface of the arm 51 in any approved manner, and is adapted to normally engage an operating rod 56.

A disc 57 is located within the container 23 below the closure or cover plate 25 and the lower end is provided with an upstanding annular boss 58 disposed concentrically of the center of the disc 57 and forming a cup-shaped member. A packing 59 is located within the cup-shaped member and embraces the stem or rod 56 which is secured to the center of the disc 57.

A bushing 60 is threaded into an opening at the center of the cover plate 25 and also through the plate 50. A nut 61 is screwed onto the outer projecting end of the bushing while a sleeve 62 is threaded onto the inner end of the bushing so that the bushing will be locked in position on the plate 25. The inner end of the sleeve 62 is free of threads and neatly engages the outer cylindrical wall of the cup-shaped valve member 58. The inner end of the bushing 60, as shown at 63, is rounded and engages the upper end of a packing 59 which is formed of elastic or compressible material which will act as a seal when engaged by the rounded portion 63 of the bushing 60 and prevent liquids from the container 23 escaping through the closure 25.

Disposed within the container 23 is a screen 65 and this screen is in the form of a cylinder with a bottom 66 which is also made of a material of fine mesh so that when the liquid enters the bottom of the container it must pass up through the screen before it reaches a float 67.

The float may be of any well known type and is provided with a contacting surface 68 adapted to engage the underface of the disc 57 for raising said disc and likewise the rod 56 when the liquid in the container 23 rises to a predetermined height.

As has been stated, the container 23 is located at a predetermined height with respect to the level of the liquid of the cooling system of the engine and this height is such that when the switch 17 is closed the lamp 18 or other indicating means will be set in operation until the engine has been started when the liquid in the cooling system will be put in circulation. When the water has been sufficiently heated it will rise within the container 23 and elevate the float 67 whereby the switch arm 51 will be raised out of engagement with the contact 20, thereby breaking the circuit to the lamp 18. It is important to note that the normal position of the arm 51 when the engine is cool is in the lowermost position, as shown in Fig. 2 while when the cooling system is at the proper level and when the engine is operated the arm 51 will be in the position shown in Fig. 5.

When the level of the liquid in the cooling system falls below a predetermined point sufficient liquid will not enter the container 23 for raising the float 67. Therefore, the weight 54 will maintain the arm 51 in its lowermost position for engagement with the contact 20 so that the lamp 18 will be in operation. This will be a warning to the operator of the vehicle that it is necessary to supply additional fluid to the cooling system. This warning, however, is given to the operator of the vehicle before the level of the liquid falls below a predetermined height and before the thermometer or other visible indicator on the instrument panel will disclose a high temperature of the cooling fluid.

When it is found that the lamp 18 is lighted after liquid has been added to the radiator then it may be necessary to remove the screen 65 and clean the same of foreign matter. Below the bottom 66 of the screen a spongy material 70 may be located between the bottom of the container 23 in order to aid in the filtering of the cooling fluid. When this is done it may be only necessary to cleanse the spongy material 70 of foreign matter. In the event that the temperature gauge on the instrument panel should show that the liquid in the cooling system is being heated unnecessarily and the lamp 18 has not given such indication, the lamp should be tested and if it has been burnt out it should be renewed. If on the other hand, the lamp is in good condition and it is known that the screen 65 is clean, then the operator of the car should look for trouble in some other element of the cooling system.

A hose 28 has been connected with the inlet side of the motor 12 where the pressure may not rise above one pound. On the other hand if it where connected with the outlet side of the pump 12 the pressure may rise to twenty pounds or more and thus the level of the liquid in the container 23 would be maintained at a level which would prevent lighting of the lamps 18 under abnormal conditions of an inadequate supply of cooling liquid in the system.

The pipe 72 is in communication with the tube 28 adjacent the inlet end of the pump and also is in communication with the connection 73 between the cylinder block and the outlet pipe 14. The pipe 72 connects the pipe 28 with the outlet connection 73 of the water jacket of the engine and a valve 74 controls communication between the outlet end 73 and the pipe 28 when it is found that the pressure at the inlet side of the pump 12 is not sufficient to force the cooling liquid through the pipe 28 to the container 23 and thence through the pipe 39. The connections 72 and the valve 74 are only employed in the earlier types of automobile engines where the inlet side of the pump does not develop sufficient pressure for the purpose.

When it is found that the pressure of the pump 12 at the inlet end is not sufficient to force the fluid through the sponge 70 and into the container 23, and also through the screened cap 32a for raising the float 67, the valve 74 is opened so that the pressure at the outlet end of the cooling system is transmitted to the fluid in the pipe 28 for boosting up the pressure on the liquid in the pipe 28 so that the liquid will rise in the container 23.

The liquid must be forced through the sponge or other filtering material 70 and thence through the screen 65 where the level of the liquid can effect the rise and fall of the float 67.

The greater part of the filtering is done by the sponge or other suitable filtering material 70 while the cup-shaped screen 65 maintains the filter material in the lower part of the casing 23 in order to provide a chamber at the upper end of the casing so that the liquid can control the movement of the float 67. Dependence, however, of the member 70 as a filter is relied upon rather than the screen 75 because by the removal of the screen the filtering material may also be removed and washed and then replaced.

I claim:

In a warning signal for cooling systems of automobiles, a container adapted to be secured in position adjacent the normal level of the fluid in the cooling system, a cover for the container having an opening therein, a float in the container, a switch operating rod projecting through the opening in the cover and having the inner end engaging the float, a lever formed of conducting material and pivoted at one end on the cover and insulated therefrom, insulating material secured to the underface of the lever and resting on the projecting end of the rod, a contact secured to and insulated from the cover, the free end of the lever adapted to engage the contact when the rod is lowered, a sleeve secured to the underface of the cover, a bushing secured to the cover located within the sleeve and slidably receiving the rod, a cup-shaped member secured to the upper face of the float, received by the sleeve and cooperating with the bushing for maintaining the rod in vertical alinement with the insulating material on the lever.

DALE R. MORRIS.